United States Patent [19]

Prete

[11] Patent Number: 4,500,949
[45] Date of Patent: Feb. 19, 1985

[54] CHOPPING TYPE ELECTRICAL CONVERTER

[75] Inventor: Ralph Prete, West Haven, Conn.

[73] Assignee: Stone Safety Corporation, Wallingford, Conn.

[21] Appl. No.: 465,839

[22] Filed: Feb. 14, 1983

[51] Int. Cl.³ .............................................. H02M 3/315
[52] U.S. Cl. ....................................... 363/28; 363/124
[58] Field of Search .................. 363/27, 28, 57, 58, 363/124, 135, 136

[56] References Cited

U.S. PATENT DOCUMENTS

| | | | |
|---|---|---|---|
| 3,573,597 | 4/1971 | Genuit | 363/28 |
| 3,893,015 | 7/1975 | Weil | 363/27 |
| 4,069,449 | 1/1978 | Farnsworth | 363/28 |
| 4,369,489 | 1/1983 | Pruitt | 363/28 |

*Primary Examiner*—William M. Shoop
*Attorney, Agent, or Firm*—DeLio and Libert

[57] ABSTRACT

A chopping type electrical converter having a primary circuit utilizing controlled rectifiers for chopping the input voltage, a secondary circuit for providing a DC output voltage, and a control unit which continuously monitors current flow in the secondary circuit and delays trigger pulses to the controlled rectifiers in the primary circuit whenever it is unsafe or undesirable to trigger them. In a preferred embodiment, the controlled rectifiers are mounted in series-connected pairs with a step-down transformer for each controlled rectifier. The number of pairs and the interwoven triggering order of the controlled rectifiers enables high voltage and high frequency operation with minimal stress on the converter components. The control unit prevents each member of each pair of controlled rectifiers from being triggered whenever the other member of the pair is still conducting, or whenever current is flowing in the secondary winding of the transformer associated with the controlled rectifier. The control unit also provides output voltage regulation and current limiting, and shuts down converter operation during overload or malfunctions. Accoustical noise suppression is incorporated, wherein the converter operating frequency is continuously modulated even under a constant load to spread the converter noise throughout the audible spectrum and thereby submerge it beneath the noise background.

21 Claims, 24 Drawing Figures

CHOPPING TYPE ELECTRICAL CONVERTER

BACKGROUND OF THE INVENTION

This invention relates to chopping type electrical converter power supplies suitable for converting an unregulated input voltage to a regulated DC output voltage at a desired level. This invention is most easily described as it relates to solid state DC to DC converters using the well known fly-back chopping technique where the chopping frequency is varied to hold the output voltage constant at different load levels, and where step-down transformers are used to obtain voltage reduction, and capacitive output filtering is used to achieve acceptable ripple voltage levels.

Solid state converters of this type are well suited for use at lower voltages. However, for operation from relatively high voltage DC sources in the range of 600 to 1200 volts DC, as is commonly supplied to power electric rail vehicles, the stress placed upon the converter operating components is extremely severe and results in frequent component failures. This is due in part to the extremely harsh electrical environment in which the converter must operate and in part to the inherent operating limitations of the components themselves.

Electric rail vehicles obtaining high voltage DC power from third rail or catenary via sliding collectors require a low level stable DC voltage suitable for providing lighting and control power and for recharging on board batteries. The high voltage input to a converter mounted in an electric subway or railway vehicle is subject to extreme variations in level, as the sliding collector of the vehicle in which the converter is mounted makes intermittent contact with the third rail or catenary, and as the intermittent contact of other vehicles imposes switching transients on the high voltage line. As a consequence, the electrical equipment which is connected directly to the high voltage input is subjected to frequent high energy and potentially destructive voltage transients.

Chopping-type designs using thyristors or silicon controlled rectifiers (SCR's) to chop the input voltage, followed by transformer voltage reduction and capacitive output filtering can efficiently convert a higher DC voltage to a lower one. However, when operated at high voltage levels, previous designs have required the SCR's and the electrolytic filter capacitors (which are commonly used due to their small physical size) to operate at or near their operative limits.

For example, it is known that an SCR chopping a given input voltage will encounter voltages across it of twice the input voltage even when the input voltage is well regulated. For 600 volt operation, previous designs using two chopping SCR's have required SCR's rated at 1,000 volts, and for a high power converter (above 5 kilowatts, for example) where the 600 volt line has the type of high energy transients previously described, even this rating is not adequate. Unfortunately, small, high speed, high power SCR's with a higher voltage rating such as are required to achieve a high chopping rate are not commonly available.

A second problem encountered in high voltage operation is that electrolytic capacitors are not readily available rated at voltages in excess of 450 volts. Furthermore, in order to obtain a reasonable operating lifetime from such capacitors, they should be operated at 60% or less of their rated voltage. Accordingly, for two capacitors in series functioning as an input filter, as used in the prior art design, 600 volts is the maximum permissible operating voltage for reliability purposes. This leaves little or no margin for handling voltage transients.

In order to operate at 600 volts, previous converter designs have relied upon expensive and bulky input filters specially designed to trap and absorb the high energy transients before they could reach and damage the SCR's and electrolytic capacitors. This invention is capable of continuously operating at twice the input voltage of previous designs and can eliminate the bulky transient filters previously required.

A second major problem encountered in previous designs has been the low operating frequency inherent in such designs. In chopper-type converters there exists a close relationship between the physical size of the converter and its operating frequency. The higher the frequency at which the converter can be operated, the smaller the filter capacitors and magnetic components can be. At low power levels, the primary limit on capacitor size is that the capacitor must be large enough to reduce voltage ripple to an acceptable level. The higher the operating frequency, the less the voltage ripple for a given capacitance.

At high power levels, an even more severe limit is placed on capacitor size, requiring a capacitor larger than would be required to satisfy the voltage ripple requirement. At such high power levels, filter capacitors are subject to very high ripple currents. In a capacitor chosen just large enough to satisfy the voltage ripple requirement, the high ripple current causes unacceptable $I^2R$ heating of the capacitor and premature failure.

Operating at a higher frequency reduces both the ripple current and the ripple voltage allowing smaller filter capacitors to be utilized. Because filter capacitors are one of the larger converter components, this allows a substantial reduction in converter size. Unfortunately, as will be described in greater detail, previous designs have been limited in the maximum frequency at which they could operate. This invention is capable of operating at a frequency in excess of twice the frequency of previous designs.

Previous converter designs have used a voltage controlled oscillator to generate trigger pulses for the SRC's. As the load draws a heavy current, the output voltage tends to fall, and this falling voltage is sensed and used to increase the oscillator frequency to maintain the converter output voltage.

In a chopper-type design using step-down transformers, the maximum operating frequency is limited by two primary considerations. The first is that "backfiring" must not occur. Backfiring refers to applying a trigger pulse to an SCR located in the primary circuit of the step-down transformer before current has ceased to flow in the secondary circuit of the transformer, which can lead to very dangerous and destructive voltage transients.

The second consideration is that "crossfiring" must not occur. Crossfiring refers to applying a trigger pulse to the second SCR in a pair while current continues to flow through the first SCR. Crossfiring two SCR's leads to a direct short across their high voltage input.

In order to avoid crossfiring or backfiring, prior art designs have set a maximum operating frequency for the oscillator, selected in advance to be low enough to avoid these two problems in the "worst-case" which the converter might face. However, the converter seldom, if ever, must operate under worst case conditions, and under normal operating conditions, the worst-case limit on the operating frequency is substantially more restrictive than is necessary.

This invention avoids the use of such a worst-case upper frequency limit by continuously monitoring important circuit parameters and setting the upper frequency limit according to the instantaneous circuit operating conditions.

Previous designs have also suffered from other problems which this invention has solved. With some types of oscillating loads, the type of free-running oscillator with voltage control previously used could set up "harmonic" or self-oscillating modes of converter operation wherein essentially all of the converter load is placed on a single SCR causing it to fail. Additionally, non-linear operation of the type of free-running oscillator previously used has greatly complicated converter design.

SUMMARY OF THE INVENTION

This invention comprises a chopping type electrical converter wherein the chopping frequency is varied to control the DC output voltage. A primary circuit chops the input voltage, and a secondary circuit rectifies and filters the output voltage. A control unit monitors the output voltage and current flow in the secondary circuit and provides trigger pulses at a variable frequency to the controlled rectifiers in the primary circuit to hold the output voltage constant. Trigger pulses to the controlled rectifiers are delayed whenever the control unit senses current flow in a monitored portion of the secondary circuit. A trigger pulse can only pass out of the control unit when the sensors indicate that backfiring or crossfiring will not occur.

A preferred embodiment is disclosed in detail utilizing two pairs of SCR's to chop the input voltage. Nevertheless, the invention will operate effectively with only a single SCR in a conventional chopping converter design, or with multiple pairs of SCR's in a high voltage configuration. By maintaining individualized control over the transmission of each trigger pulse, and by transmitting each trigger pulse only when backfiring or crossfiring cannot occur, the maximum chopping frequency of the converter at each point in time is limited only by the inherent backfiring and crossfiring frequency units of the circuit at that point in time, and not by the worst case condition that might occur.

In the preferred embodiment, a design for the primary and secondary circuit is disclosed which provides numerous advantages when used in conjunction with the control unit.

The preferred embodiment of this invention is able to operate at well above the input voltage of previous designs by increasing the number of SCR's over which the input voltage is applied. By interweaving the firing order of the SCR's and by increasing the number of SCR's, the maximum operating frequency is increased while the voltage stress on each SCR is reduced. As previously described, this design provides significant advantages in reducing converter size, increasing component operating life, and providing an increased safety margin against high voltage transients.

The control unit continuously monitors the significant operating parameters of the circuit such as the current flowing in the secondary circuit of the step-down transformers, the output voltage, and the load current, and trigger pulses are applied to the SCR's only when it is safe to do so. This monitoring completely eliminates the possibility of backfiring or crossfiring while simultaneously allowing the converter to operate at the maximum frequency set by the converter operating conditions at that point in time. During normal operation, the converter can operate at a frequency well above the frequency that would cause backfiring under worst case conditions. Whenever the control circuit senses that it is unsafe to fire an SCR, the trigger pulse is delayed until such time as the unsafe condition has ceased to exist.

A special type of variable frequency pulse generator capable of linear operation down to zero frequency is used in conjunction with trigger circuitry that guarantees that the SCR's can be triggered only in the correct interwoven firing order.

The control unit prevents an SCR in the primary circuit of a step-down transformer from being fired until after current has ceased to flow in the secondary circuit. This eliminates backfiring and as will be explained more fully, also eliminates crossfiring. As long as current flows in the transformer secondary, the trigger pulse to the SCR in the primary will be delayed, and because the SCR's are only fired in the correct interwoven order, all the succeeding pulses are delayed. The use of this closed loop monitoring system allows the converter to operate at the maximum frequency permitted by the operating conditions at each point in time without the possibility of backfiring or crossfiring. The interwoven firing order and the backfire prevention circuitry prevent harmonic modes of converter operation.

Additionally, the control circuit monitors the output voltage and the load current and can sense various types of converter malfunctions and overloads, and can limit the operating frequency or shut down the converter entirely as required. A noise reduction circuit is incorporated to minimize objectionable accoustical noise due to magnetorestrictive effects while the converter is operating under constant load conditions.

BRIEF DESCRIPTION OF THE DRAWINGS

FIG. 8 shows a second embodiment of the invention wherein pulse transformers have been utilized to provide electrical isolation between the control unit and the high voltage circuitry of the converter.

DETAILED DESCRIPTION OF THE PREFERRED EMBODIMENT

Figure 1:
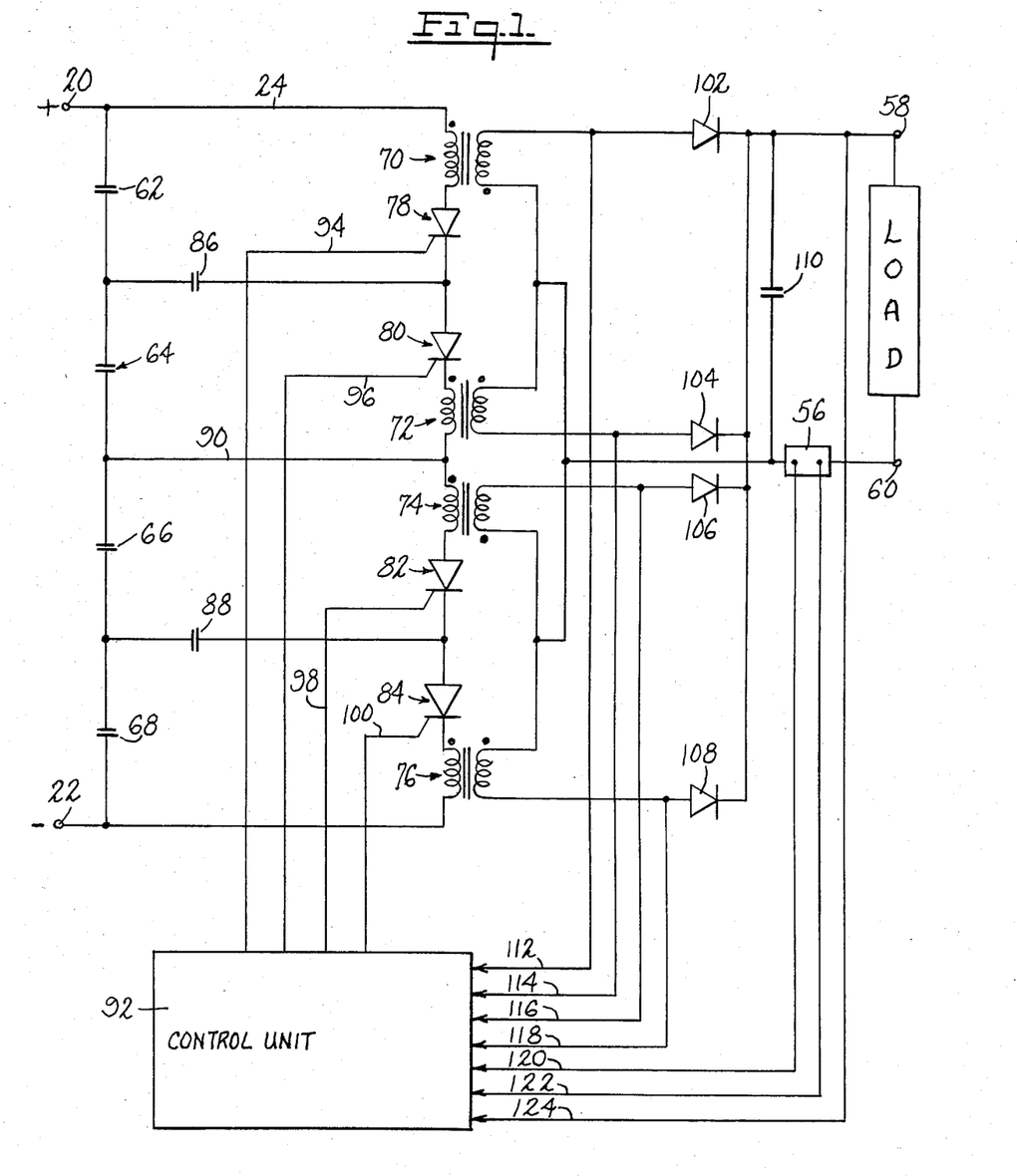
FIG. 1 is a schematic circuit diagram, partly in block form, depicting a DC to DC converter circuit according to one embodiment of the present invention.

Referring to FIG. 1, there is shown a circuit diagram, partly in block form, of a DC to DC converter constructed in accordance with the invention. The operation of this circuit will be understood more easily from a consideration of the operation of the prior art circuit shown in FIG. 2 and by reference to the graphs shown in FIG. 3.

Figure 2:
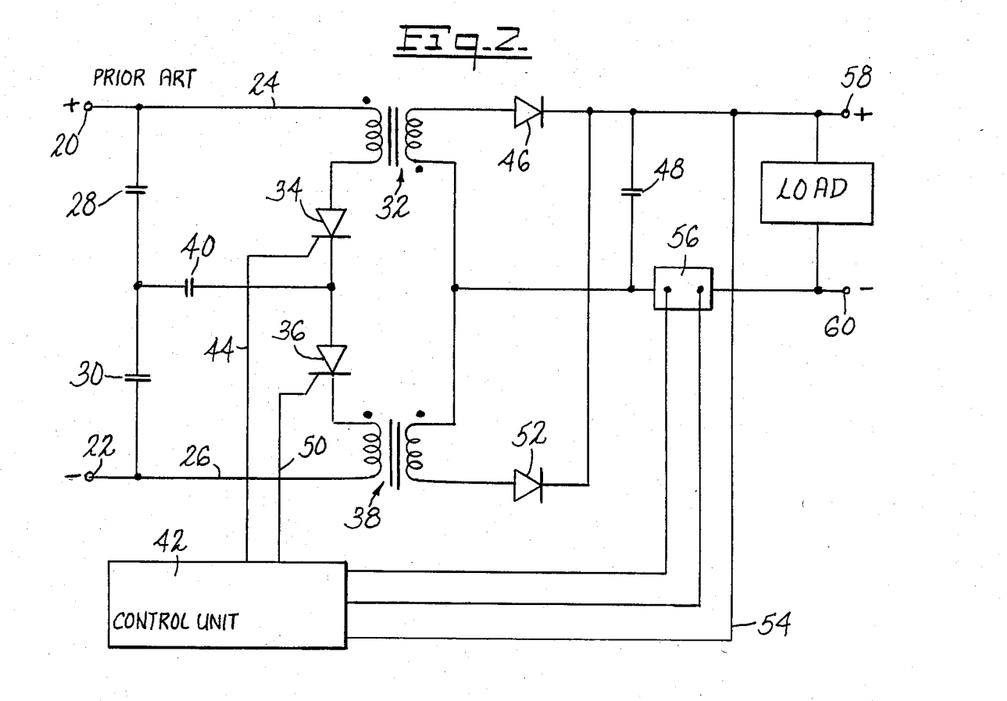
FIG. 2 is a schematic circuit diagram, partly in block form, for a DC to DC converter constructed in accordance with the principles of the prior art.
Figure 3:
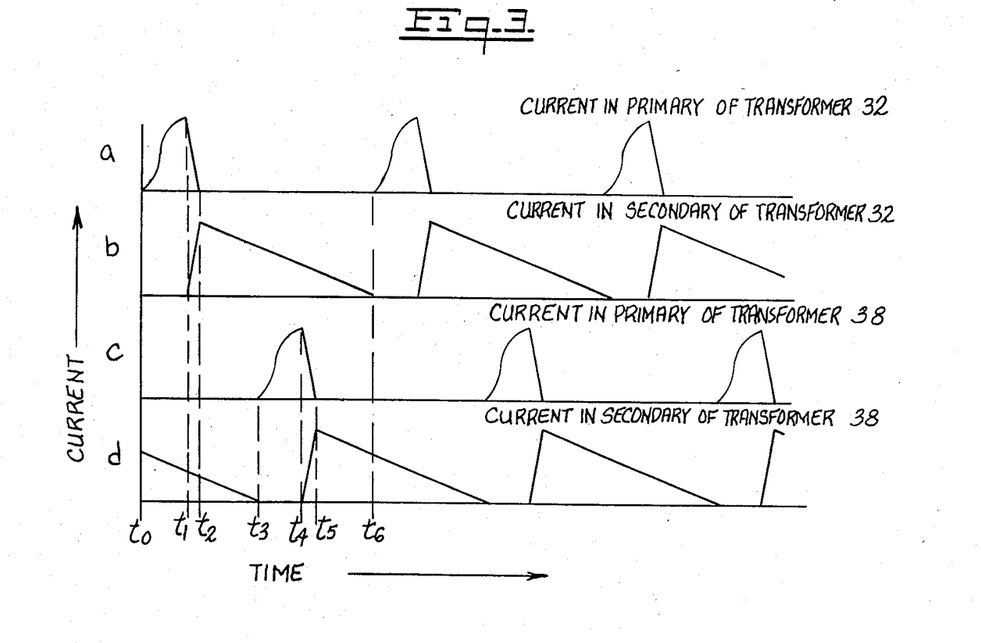
FIGS. 3(a) and 3(b) are graphs which show current flow as a function of time in the primary and secondary circuits respectively of transformer 32 in FIG. 2.
FIGS. 3(c) and 3(d) are graphs which show current flow as a function of time in the primary and secondary circuits respectively of transformer 38 in FIG. 2.

Referring to FIG. 2 there is shown a DC to DC converter of a design which is well known in the prior art. Input terminals 20 and 22 are provided for connection to the positive and negative lines respectively of a high voltage DC source. Connected in series between the positive high voltage bus 24 and the negative high voltage bus 26 are two input filter capacitors 28 and 30 forming a capacitive voltage divider. Also connected in series relation across the high voltage bus lines 24 and 26 are the primary of transformer 32, upper SCR 34, lower SCR 36, and the primary of lower transformer 38.

Capacitor 40 is connected between the junction of capacitors 28 and 30, and the junction of SCR's 34 and 36.

Assuming first that both SCR's 34 and 36 are not conducting, there is no current flowing through either SCR or through the primary of either transformer, and consequently, the full voltage from the high voltage source appears across SCR's 34 and 36. At a signal from the control unit 42, SCR 34 is gated on via control line 44. Because SCR 36 remains off and blocks current flow, current begins to flow in the resonant circuit comprised of capacitor 40 and the primary of transformer 32 through SCR 34.

Because of the polarity of the connections of the primary and secondary windings of transformer 32, as indicated by the phasing dot markers thereon, and the direction of diode 46, initially no current flows in the secondary of transformer 32 when SCR 34 is triggered on. As current flows through SCR 34, capacitor 40 charges until the voltage across it approximately equals the voltage across capacitor 28. At this time the voltage polarity across the primary of transformer 32 reverses, and the energy stored in the primary continues to charge capacitor 40.

At the same time that polarity reversal occurs across the primary of transformer 32, polarity reversal occurs across the secondary of transformer 32. This causes current to flow through diode 46 into the load and the output filter capacitor 48. As capacitor 40 continues to charge, the current through SCR 34 drops rapidly until SCR 34 ceases to conduct.

At this point, it is possible for the control unit 42 to trigger on lower SCR 36. If SCR 36 is triggered on prior to the point in time when SCR 34 has ceased to conduct, SCR 34 will not turn off, and current will flow directly from high voltage bus 24 through the primary of transformer 32, through both SCR's, and through the primary of transformer 38 to the negative high voltage bus 26. This constitutes a direct short across the high voltage input and will quickly destroy both SCR's. This condition is termed "crossfiring" and must be avoided by proper restraints on the triggering frequency supplied by control unit 42 over control lines 44 and 50.

Capacitor 40 and the primary of lower transformer 38 comprise a second resonant circuit similar to the upper one just described. When SCR 36 is triggered on by the control unit via control line 50, current flows in the primary circuit of transformer 38 until capacitor 40 has discharged sufficiently, at which time polarity reversal occurs across the primary and secondary of transformer 38, and current flows through diode 52 and into the load and output filter capacitor 48.

The proper operation of the prior art circuit shown in FIG. 2 can be more readily understood by reference to FIGS. 3(a) through 3(d).

FIG. 3(a) shows the current flowing through the primary of transformer 32, and FIG. 3(b) shows the current flowing through the secondary of transformer 32, plotted as a function of time. At time $t_0$, control unit 42 triggers SCR 34 on and current begins to flow in the primary of transformer 32 as can be seen in FIG. 3(a). At time $t_1$, capacitor 40 has charged sufficiently to cause polarity reversal at the primary and secondary of transformer 32. At this time, the current through the primary of transformer 32 drops rapidly while the current through the secondary of transformer 32 increases rapidly, until at time $t_2$ the current through the primary has reached zero, SCR 34 has ceased to conduct, and the current through the secondary of transformer 32 has reached a maximum.

The turns ratio on transformers 32 and 38 are chosen to as to provide the proper voltage reduction. In order to prevent damage to SCR 34, the control unit must not trigger SCR 34 on until after all current has ceased to flow in its associated secondary circuit. Firing an SCR in the primary circuit before current has ceased to flow in the secondary circuit is termed "backfiring" and causes dangerous and destructive voltage transients.

As can be seen from FIGS. 3(a) and (b), the current flows in the primary circuit of transformer 32 from time $t_0$ to $t_2$ and current flows in the secondary circuit from time $t_1$ to $t_6$. Because SCR 34 must not be backfired, the earliest that it can be triggered is after time $t_6$. This sets the maximum operating frequency of SCR 34. It should be noted that this maximum operating frequency for SCR 34 varies under different circuit conditions, and does not remain static.

SCR 36 has the same backfire requirements that SCR 34 has, i.e., it cannot be triggered on while current continues to flow in its secondary circuit.

FIG. 3(c) shows the primary current in transformer 38, while FIG. 3(d) shows the secondary current in transformer 38. Therefore, the maximum operating frequency of SCR 36 is the same as that of SCR 34.

Although the circuitry inside control unit 42 has not been shown, previous designs have commonly used a free-running voltage controlled oscillator with a fixed maximum operating frequency. Under heavy load conditions, the output voltage begins to fall and this is sensed by the voltage sensing line 54. The sensed output voltage is used to increase the frequency of the voltage controlled oscillator. Pulses from the oscillator are used to trigger SCR's 34 and 36 alternately at a higher frequency (up to the maximum permitted operating frequency) so as to keep the output voltage across the load and capacitor 48 constant. Typically, load current sensing is provided such as is shown by current sensor 56, which is used to limit the output current.

Many problems have arisen with respect to the DC to DC converter design shown in FIG. 2, particularly with operation at high voltages and high power levels where high voltage and high power transients are to be expected at the input terminals. For example, capacitors 28 and 30 are exposed directly to the high voltage input. Because high voltage capacitors of reasonable size are not readily available, bulky and expensive input filtering must be provided to absorb and trap high energy and high voltage transients which could destroy the input filter capacitors. This same point applies to SCR's 34 and 36 which are located across the high voltage input and which are susceptible to destruction from high voltage transients.

Control unit 42 in the prior art design has been required to eliminate backfiring by limiting the operating frequency of the converter. This has previously been accomplished by determining the worst case conditions which might be encountered at the output terminals of the converter 58 and 60 and by appropriate design ensuring that the converter can never exceed the frequency that would cause backfiring under the worst case conditions. However, this worst case frequency limit is substantially more restrictive than the frequency at which the converter can safely operate under most load conditions, thereby reducing its performance.

Additionally, the low operating frequency of this design requires large and bulky capacitors to hold output voltage ripple at acceptable levels. At high power levels, the ripple current in the input (28, 30) and output (48) filter capacitors is so high that significant heating occurs which shortens the filter capacitor life. In many cases, this ripple current requires the use of a larger capacitor than would otherwise be necessary for adequate output voltage regulation, thus adding to the physical size of the converter.

Because of the close relationship between the physical size of the converter and the operating frequency, it is desirable to operate the converter at as high a frequency as possible. However, because of the backfire and crossfire limitations which are inherent in the prior art design, the operating frequency has a fundamental upper limit set by the use of the single pair of SCR's. This fundamental limit has been reduced even further by the use of the preset worst case frequency limit in the control unit.

Referring now to FIG. 1, the preferred embodiment of the invention can be seen. Input filter capacitors 62, 64, 66, and 68 are connected in series between the high voltage positive bus 24 and the high voltage negative bus 26. Also connected in series between the high voltage bus lines are the primaries of transformers 70, 72, 74, and 76, and SCR's 78, 80, 82, and 84. Capacitor 86 is connected between the junction of capacitors 62 and 64 and the junction between SCR's 78 and 80. In a similar manner, capacitor 88 is connected between the junction of capacitor 66 and 68 and the junction of SCR's 82 and 84. The common junction of capacitors 64 and 66 is connected to the common junction of the primaries of transformers 72 and 74 by conductor 90.

The upper portion of the primary circuit shown in FIG. 1 consisting of the components connected between the high voltage bus 24 and conductor 90 operates in substantially the same manner as described in the circuit described in FIG. 2. SCR's 78 and 80 form a pair which are fired alternately by control unit 92, by means of appropriate triggering signals on control lines 94 and 96. The lower half of the primary circuitry from conductor 90 to the high voltage negative bus 26 also operates in the manner described for the circuit shown in FIG. 2. SCR's 82 and 84 form a second pair and are also triggered alternately by means of control lines 98 and 100.

Because of the design on the high voltage input side of this invention, each of the components on the high voltage side receives one-half the voltage stress of a corresponding component in FIG. 2. Accordingly, with the same operating voltage applied to the input terminals 20 and 22 of FIG. 1 and FIG. 2, the circuit in FIG. 1 can operate with capacitors and SCR's rated at one-half the voltage of the corresponding components in FIG. 2. Alternately, for components of equivalent ratings, the circuit in FIG. 1 is capable of operating at twice the sustained voltage of the circuit in FIG. 2. Because the components receive less stress in the design shown in FIG. 1, it is possible to eliminate the need for the bulky and expensive filters used for trapping high energy and high voltage transients which are required in utilizing the design shown in FIG. 2 where the components were operating near their maximum voltage ratings. One skilled in the art will also note that it is possible to increase the number of SCR pairs in a simple manner for operation at higher input voltages.

The secondary of transformer 70 is connected with the polarity as indicated to the anode of diode 102. In a corresponding manner, one lead from the secondary winding of transformers 72, 74, and 76 is connected to the anode of diodes 104, 106, and 108, respectively. The cathode of all of these diodes meets at a common junction and is connected to the positive output terminal 58 and the output filter capacitor 110. The other leads from the secondary of each transformer are connected together and form a common line connected to the other side of the output filter capacitor and output terminal 60. Current sensor 56 is placed in the return line to monitor load current, and in the preferred embodiment comprises a Hall Effect-type device providing voltage isolation between the control unit 92 and the secondary circuit.

Referring now to FIG. 4(a), the current through the primary winding of transformer 70 and through SCR 78 can be seen. At time $t_0$ control unit 92 triggers SCR 78 into conduction via control line 94. As was previously described, current builds up in the primary circuit of transformer 70 and flows down through the primary winding of transformer 70, through SCR 78 and into capacitor 86 which begins to charge. At time $t_1$, capacitor 86 has charged to approximately the same level as the voltage across capacitor 62, and the polarity of the voltage across the primary and secondary windings on transformer 70 reverses. At this time, the current through the primary winding of transformer 70 falls rapidly until at time $t_2$, as seen in FIG. 4(b), it has fallen to zero and SCR 78 turns off.

At time $t_2$ current in the secondary of transformer 70 has reached a maximum as can be seen in FIG. 4(b). This current continues to flow through diode 102 and into the load and output filter capacitor 110 until at time $t_7$, as seen in FIG. 4(b), the secondary current has fallen to zero. In order to prevent crossfiring, SCR 80 must not be fired until after SCR 78 has ceased to conduct. The current through the primary of transformer 72 and through SCR 80 is shown in FIG. 4(c). It can, therefore, be seen that the operation of the upper pair SCR's 78 and 80 is substantially the same as the operation of SCR's 34 and 36 in FIG. 2. The maximum operating frequency for these two SCR's is set by the crossfiring and backfiring requirements in the same manner as that set for the circuit shown in FIG. 2.

Figure 4:
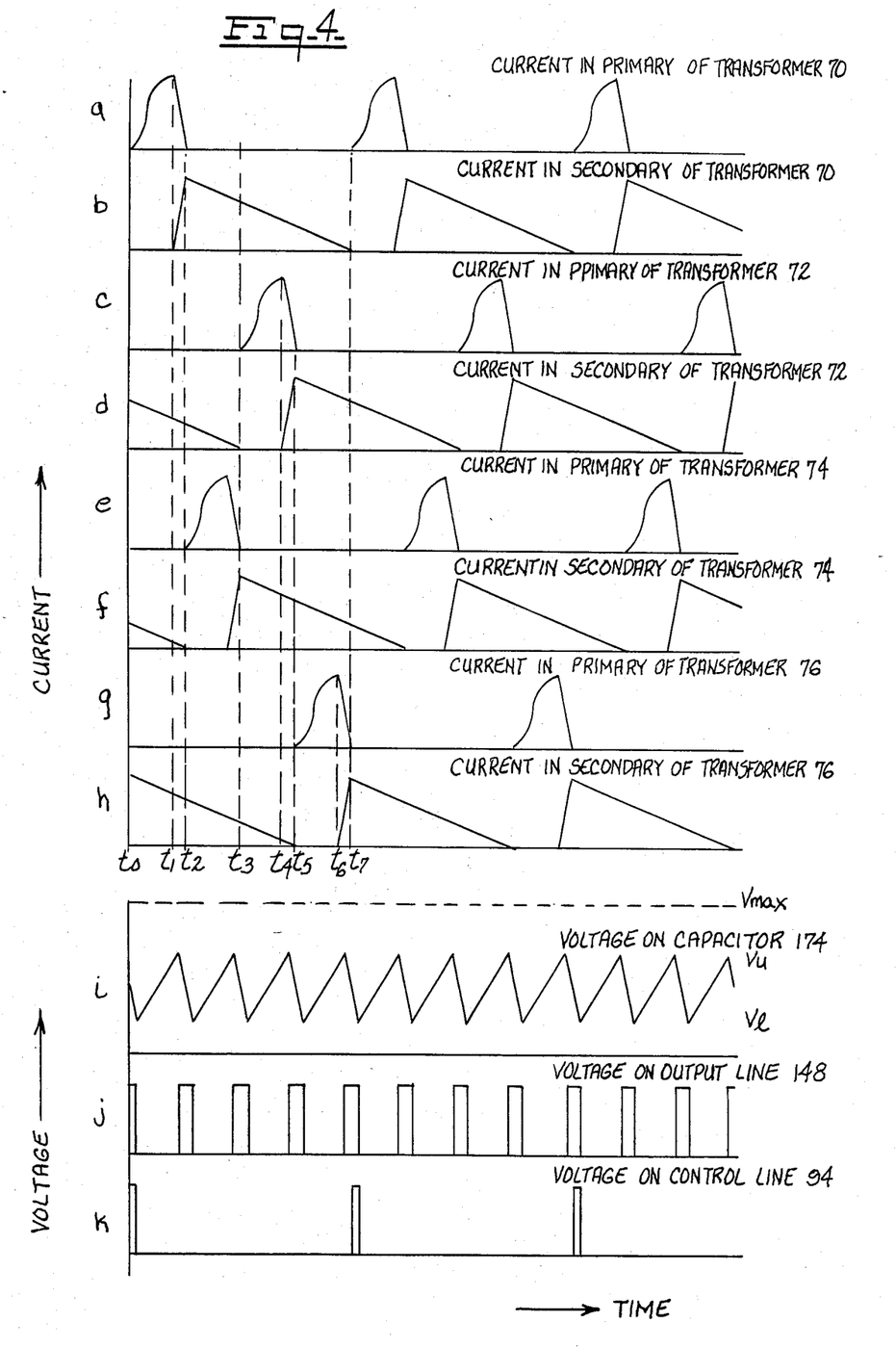
FIGS. 4(a) and 4(b) are graphs which show current flow as a function of time in the primary and secondary circuits respectively of transformer 70 in FIG. 1.
FIGS. 4(c) and 4(d) are graphs which show current flow as a function of time in the primary and secondary circuits respectively of transformer 72 in FIG. 1.
FIGS. 4(e) and 4(f) are graphs which show current flow as a function of time in the primary and secondary circuits respectively of Transformer 74 in FIG. 1.
FIGS. 4(g) and 4(h) are graphs which show current flow as a function of time in the primary and secondary circuits respectively of transformer 76 in FIG. 1.
FIG. 4(i) is a graph which shows the voltage across capacitor 174 in FIG. 6 as a function of time.
FIG. 4(j) is a graph which shows the output voltage pulses as a function of time from the voltage controlled pulse generator 128 on output line 148 of FIGS. 5 and 6.
FIG. 4(k) is a graph which shows the output voltage trigger pulses as a function of time on control line 94 of FIG. 5 which are used to trigger SCR 78 of FIG. 1.

However, the present invention uses an additional pair of SCR's, 82 and 84, connected in series with SCR's 78 and 80, which are only limited by their own crossfiring and backfiring requirements. Control unit 92 fires the SCR's in a prescribed interwoven order. This can be seen in FIG. 4 which shows the voltages and currents at key points while the circuit is operating at a high frequency. First control unit 92 triggers SCR 78 at time $t_0$ as can be seen in FIG. 4(a). Between time $t_0$ and $t_2$, SCR 80 cannot be fired because of the crossfiring requirements. Between time $t_2$ and $t_3$, SCR 80 cannot be fired because current continues to flow in its secondary from the previous cycle, as can be seen in FIG. 4(d).

However, after SCR 78 has been triggered, SCR 82 can be triggered because SCR 80 blocks any current flow from the upper circuit. FIG. 4(e) shows the current through the primary of the transformer 74 and through SCR 82 and shows SCR 82 being triggered at time $t_2$.

At time $t_3$, the secondary current through transformer 72, as seen in FIG. 4(d), has decayed to zero, and SCR 80 is triggered by control unit 92.

FIGS. 4(g) and (h) show the current through the primary and secondary of transformer 76 respectively. SCR 84 is triggered at time $t_5$, and at time $t_7$, the cycle begins to repeat when SCR 78 is triggered again.

FIG. 4 shows the correct timing and sequencing of the current flows in both the primary and secondary circuits of each transformer. In this embodiment, the SCR's are triggered in the following order: SCR 78, SCR 82, SCR 80, SCR 84. The SCR's are arranged in pairs, and it is necessary for proper operation to interweave the firing order of the pairs by triggering a first SCR in each pair in sequence, before triggering the second SCR in each pair in sequence. Through the proper selection of components, the secondary ring time, i.e., the length of time that current flows in the secondary circuit, is made significantly longer than the primary ring time. At a given instant in time, output filter capacitor 110 is usually being charged simultaneously by three of the four secondary circuits. For example, between times $t_5$ and $t_6$, while SCR 84 is conducting, and current is flowing in its primary circuit, as can be seen in FIG. 4(g), there is simultaneously current flowing in the secondary circuits of the three remaining SCR's, as can be seen in FIGS. 4(b), 4(d), and 4(f). The number of charging pulses to output filter capacitor 110 is doubled over the number of charging pulses to the corresponding output filter capacitor 48 in FIG. 2. Because the output filter capacitor is being simultaneously charged from several sources, the RMS ripple current into that capacitor is substantially reduced compared to previous designs, and as previously described, this allows the use of smaller input and output filter capacitors.

Control unit 92 monitors the current flow in the secondary circuits of each transformer by monitoring the voltage at the anode of diodes 102, 104, 106, and 108. Sensing inputs in control unit 92 are connected to the anodes of those diodes via sensing lines 112, 114, 116, and 118.

The operation of the sensing inputs may be understood by reference to the voltage at the anode of diode 102. As may be seen in FIG. 4(a) and as was previously described, current flows through the primary of transformer 70 during the time period $t_0$ to $t_2$. From $t_0$ until $t_1$, the voltage induced in the secondary of transformer 70 applies a negative bias to diode 102, thereby preventing current flow in the secondary circuit. Sensing line 112 is able to monitor this negative voltage and can thereby determine that no current is flowing through diode 102. At time $t_1$, as previously described, the voltage across transformer 70 reverses, and diode 102 becomes forward biased. Control unit 92, via sensing line 112, monitors this voltage change at the anode of diode 102, and permits the trigger signal to be transmitted to SCR 78 over control line 94. Control unit 92 by continuously monitoring the anode voltages of these diodes, is able to determine with precision at exactly what point in time it becomes safe to trigger the SCR in the primary circuit. Through the appropriate logic units in control unit 92, which will be described, SCR 78 can never be fired while current is flowing in its secondary circuit and, therefore, backfiring is completely and positively eliminated, while the circuit is allowed to operate at the maximum frequency which is safe at that point in time considering the circuit operating conditions. This same monitoring and backfire prevention occurs at the anodes of all four diodes in the secondary circuits of each transformer.

Sensing lines 120 and 122 are used to monitor the output current of the converter. A control voltage from these sensing lines can be used by control unit 92 to limit output current and for other uses as will be described. Sensing line 124 monitors the converter output voltage and is used primarily to control the frequency at which trigger pulses are supplied to the SCR's. As the output voltage falls, the operating frequency of the converter is increased to hold up the voltage on output capacitor 110.

Figure 5:
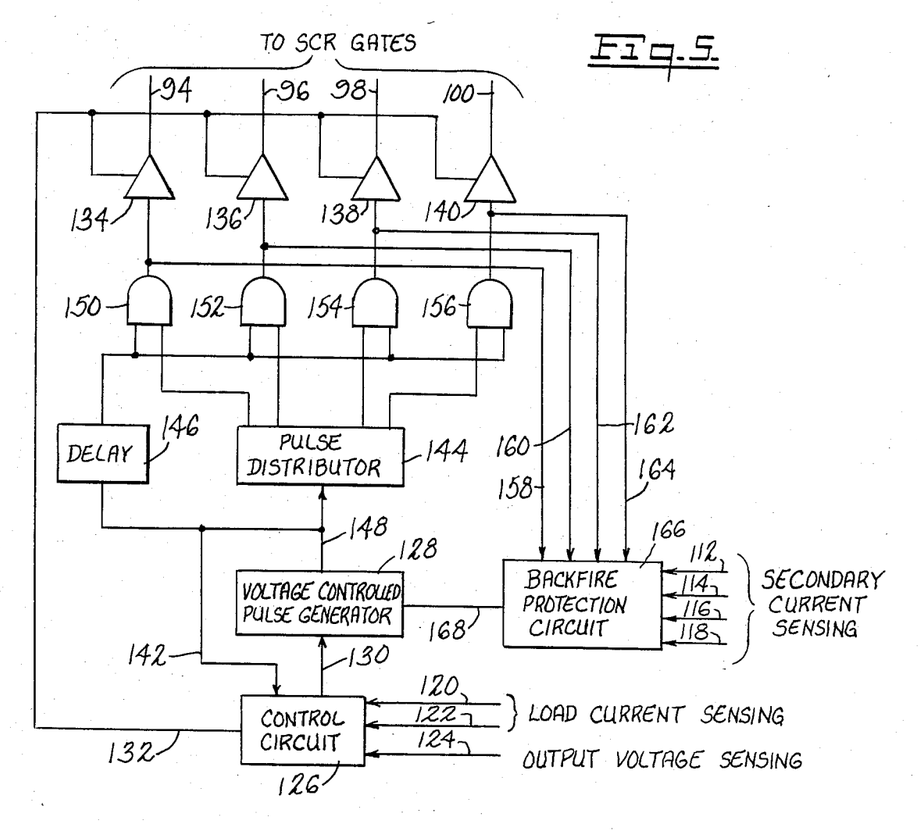
FIG. 5 is a partial circuit diagram in block form showing the control unit 92 in FIG. 1.

Referring now to FIG. 5, the circuit diagram of control unit 92 can be seen in block diagram form. Output lines 94, 96, 98, and 100, used to trigger the SCR's are shown at the top of FIG. 5, while the sensing lines 112, 114, 116, 118, 120, 122, and 124 are shown at the lower right.

The output voltage is sensed by the control circuit 126 via sensing line 124. Control circuit 126 generates a control voltage used to control the frequency at which the voltage-controlled pulse generator generates pulses. The control voltage is transmitted to the voltage-controlled pulse generator 128 over control line 130. The control circuit also monitors the output load current by means of sensing lines 120 and 122, and controls the output frequency of the voltage controlled pulse generator 128 to limit the output current where required.

Whenever the load attempts to draw current in excess of a predetermined limit set by control circuit 126, the output voltage will fall as the current remains constant. This falling output voltage is sensed by sensing line 124. Whenever the control circuit 126 is simultaneously limiting the current output and senses that the output voltage has fallen to a preset level, it disables the converter operation entirely by means of the disable line 132. This line is connected directly to the disabling input of the pulse amplifiers 134, 136, 138 and 140 and can thereby block pulses from being transmitted to the SCR gates over control lines 94, 96, 98 and 100. For example, control circuit 126 can be set to disable converter operation whenever it senses that the output voltage, as seen on sensing line 124, has fallen to 50% of the desired output voltage at the same time that it is limiting the output current. This condition would correspond to a 100% overload of the converter.

As a safety measure, control circuit 126 can also disable converter output by means of disable line 132 whenever it senses by means of sensing line 124 that the output voltage has risen significantly above the desired output voltage. This feature provides positive circuit shutdown in the event that through some circuit malfunction, high voltage appears at the output. Because the voltage controlled pulse generator 128 is capable of linear operation down to zero frequency, whenever the output voltage is significantly above the nominal output, as sensed by sensing line 124, there should be no pulses at the output of voltage controlled pulse generator 128. Accordingly, control circuit 126 monitors the output of the pulse generator via sensing line 142 and only disables converter operation via disable line 132 when it simultaneously detects an overvoltage on line 124 and the production of output pulses on sensing line 134, as this is the only condition which indicates a malfunction of the converter. When the converter is operating properly, if an externally imposed high voltage is applied to the output of the converter, for example by the malfunction of other equipment connected to the electrical system of the railway vehicle, this overvoltage condition will be sensed by line 124 and pulses will not be generated by the voltage controlled pulse generator. This will prevent the converter from operating but not by means of the disable line. As soon as the external overvoltage is corrected the converter will resume normal operation.

The pulse generator 128 operates at the converter frequency. Accordingly, it generates a single pulse for each SCR which must be fired. The output of pulse generator 128 is fed into pulse distributor 144 and simultaneously, into the delay line 146 on output line 148. Pulse distributor 144 has, at its heart, a serial-in, parallel-out shift register, and thereby insures that pulses will go to the SCR in the correct, interwoven order as previously described. Pulse distributors of this type are well known in the art.

The outputs of pulse distributor 144 and delay line 146 are fed into AND gates 150, 152, 154 and 156, which act as pulse shapers. Because the output of the AND gate will only be high when both inputs of the AND gate are simultaneously high, the width of the pulses at the output of the AND gates can be varied by varying the delay introduced in delay line 146. The width of the shaped, pulse is set by the overlap in time between the pulse as it comes out of the pulse distributor 144 and the same pulse delayed in time.

Referring now to FIG. 4(j), the pulses produced by the voltage controlled pulse generator 128 as they appear on output line 148 can be seen as they are fed into the pulse distributor 144. FIG. 4(k) shows the shaped and divided pulses at the output of pulse shaper 150. These are the trigger pulses used to trigger SCR 78 prior to amplification by the pulse amplifier 134. It can be seen that only one pulse out of every four is being used to trigger SCR 78, and that the pulse width has been substantially reduced. This reduction in width can be used to optimize the triggering of the SCR's especially when triggering is accomplished through a pulse transformer, as will be seen in FIG. 9.

Pulses are delivered to the inputs of pulse amplifiers 134, 136, 138 and 140, properly shaped at the correct frequency, and at the proper time to trigger SCR's 78, 80, 82 and 84. These pulses are monitored via sensing lines 158, 160, 162 and 164 by the backfire protection circuit 166 which also monitors the secondary current in the converter low voltage circuitry over sensing lines 112, 114, 116 and 118 as previously described.

As its name implies, the backfire protection circuit 166 prevents an SCR from being triggered whenever there is current flowing in its secondary circuit. This function is accomplished by inhibiting the formation of trigger pulse in the voltage controlled pulse generator 128 by means of the inhibit line 168.

The backfire protection circuit maintains continuous control over the generation of pulses in the voltage controlled pulse generator 128 by means of the inhibit line 168. The trigger pulse to each SCR is delayed until the backfire protection circuit has verified that the trigger pulse to the preceding SCR has gone through, and that there is no current flowing in the secondary of the SCR about to be triggered. If these two conditions are not met, generation of the next trigger pulse by the voltage controlled pulse generator 128 is delayed by means of the inhibit line 168 until such time as both conditions have been satisfied.

Figure 6:
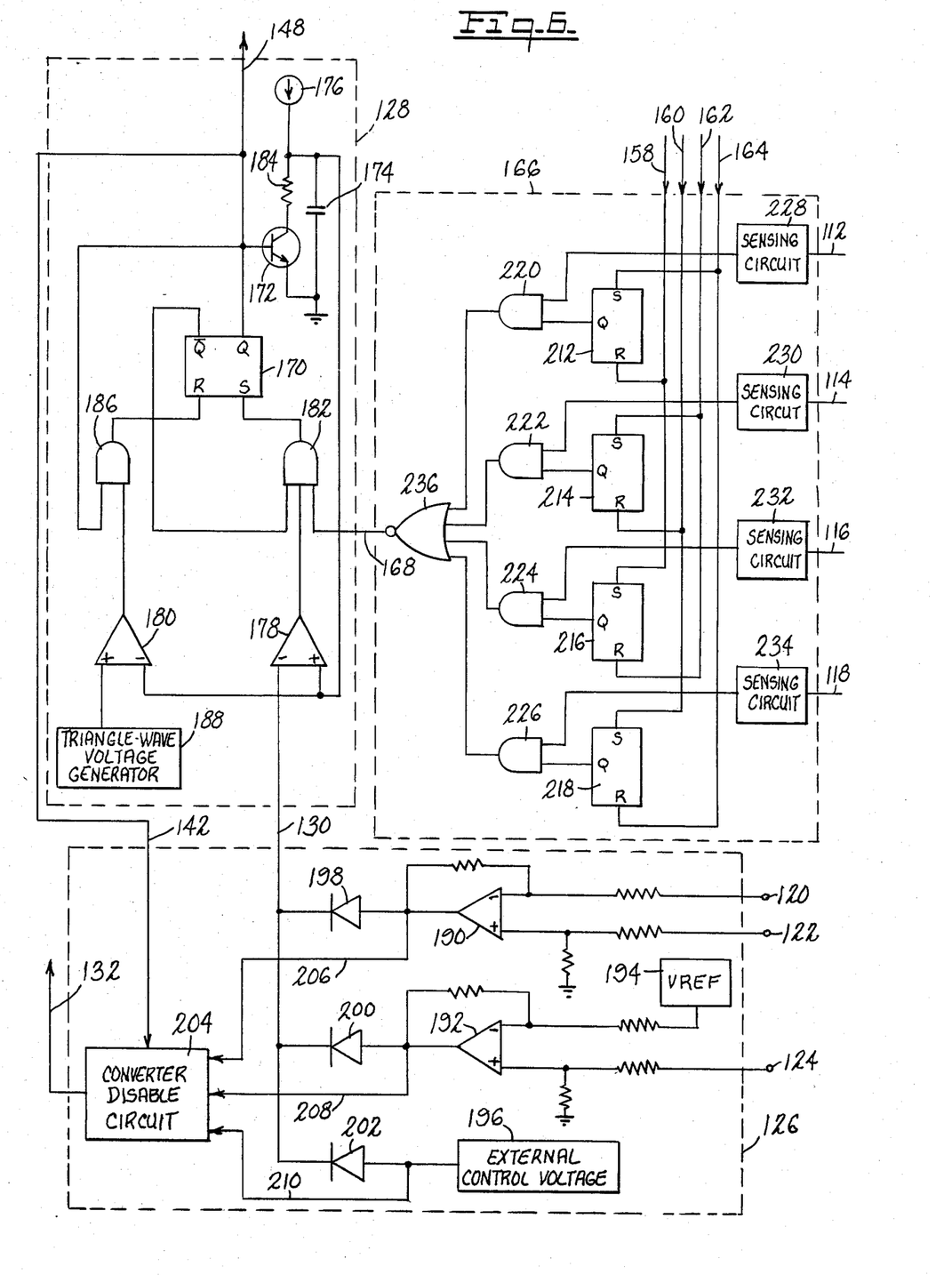
FIG. 6 is a partial circuit diagram showing the backfire protection ciruit 160, the voltage controlled pulse generator 128, and the control circuit 126 of FIG. 5.

Referring now to FIG. 6, a detailed circuit diagram of the voltage controlled pulse generator 128, the backfire protection circuit 166, and the control circuit 126 can be seen. Examining first the operation of the voltage controlled pulse generator 128, at an initial instant of time, the Q output of SR flip flop 170 is low. In this state, transistor 172 is off and capacitor 174 is being charged at a constant rate by the constant current source 176. The voltage across capacitor 174 is fed to the non-inverting input of comparator 178 and into the inverting input of comparator 180. As capacitor 174 charges, at some point in time, its voltage will exceed the voltage present on control line 130 which is fed to the inverting input of comparator 178. At this time, the output of comparator 178 will change from low to high. The output of comparator 178 is connected directly to one of the three inputs of AND gate 182. The other two inputs to AND gate 182 are connected to the not Q ($\bar{Q}$) output of SR flip flop 170 and to the inhibit line 168. Assuming that the inhibit line is high, which indicates that the backfire protection circuit 166 is not inhibiting, the output of AND gate 182 will go from low to high at the same time that the output of comparator 178 goes from low to high because the $\overline{Q}$ output of SR flip flop 170 will be high at the same time that the Q output is low. Because the output of AND gate 182 is connected to the set input of SR flip flop 170, the Q output will switch from low to high, thereby turning on transistor 172. This will discharge capacitor 174 through the transistor and resistor 184 at a rate set by the value of resistor 184.

Capacitor 174 will discharge until its voltage reaches the level present at the non-inverting input of comparator 180. At this point, the output of comparator 180 will switch from low to high. The output of comparator 180 is fed to one of the two inputs of AND gate 186 and because its other input is connected to the $\overline{Q}$ output of SR flip flop 170 which is presently high, the output of AND gate 186 will also switch from low to high. The output of AND gate 186 is connected to the reset input of SR flip flop 170 and as it goes high, it causes the flip flop to change state once again to its original state where the Q output is low, capacitor 174 begins to charge, and the cycle repeats itself.

FIG. 4(i) is a graph which shows the voltage across capacitor 174 as a function of time. A comparison with FIG. 4(j) which shows the output pulses on output line 148 will show that the pulses are high while the capacitor is discharging, and the pulses are low while the capacitor is charging. It will also be seen that as long as the inhibit line 168 is not presenting an inhibit signal to AND gate 182, the voltage on capacitor 174 will oscillate between an upper reference voltage $V_u$ set by the voltage on control line 130, and a lower reference voltage $V_1$ set by the voltage at the non-inverting input of comparator 180. The drawings in FIG. 4 have been made assuming a constant lower reference voltage $V_1$ at the non-inverting input of comparator 180 for purposes of explanation. In the preferred embodiment, however, the voltage at this input comes from the triangle wave voltage generator 188 whose operation will be described in more detail.

It can be seen that the converter operating frequency is set both by the upper reference voltage $V_u$ on control line 130, and by the lower reference voltage $V_1$ at the non-inverting input to comparator 180. Furthermore, inhibit line 168 can inhibit the formation of pulses indefinitely. Pulse generation can also be prevented when the constant current source 176, through conventional design, is prevented from charging capacitor 174 above a maximum level $V_{max}$, and the control voltage on control line 130 is set above that level.

The details of control circuit 126 are also shown in FIG. 6. Amplifiers 190 and 192 sense the output current and output voltage respectively and generate a control voltage at their outputs set by their associated resistors. Amplifier 192 compares the output voltage to a reference voltage 194 and generates a control signal based on the difference voltage between the reference voltage and the sensed output voltage. The outputs of amplifiers 190 and 192, as well as any desired external control voltage 196, are fed through the summing diodes 198 through 202 to the control line 130. The control line will therefore have the higher of the three control voltages upon it (minus the diode voltage drop), and this higher voltage will set the converter operating frequency. It should be noted that an increasing voltage on control line 130 decreases the pulse generation frequency. It may be seen that any number of control inputs may be applied to control line 130 by means of additional summing diodes.

The converter disable circuit 204 monitors the individual control voltages prior to summing via sensing lines 206, 208 and 210 and under certain conditions disables the pulse amplifiers by means of disable line 132. When the converter disable circuit 204 using sensing line 206 senses that the converter is being current-limited and that the converter output voltage has fallen below a preset level by means of sensing line 208, the pulse amplifiers are disabled. The preset level may be chosen to be 50% of the nominal output voltage, in which case the converter would be disabled at 100% overload conditions.

As previously described, the converter disable circuit also monitors the output of the voltage controlled pulse generator 128 by means of sensing line 142. When the converter disable circuit simultaneously senses that pulses are being generated, and that the output voltage has risen substantially above the nomial output voltage desired, the converter is disabled. The simultaneous presence of these two conditions will only occur during converter malfunctions because with the output voltage substantially above the desired nominal output voltage, the voltage control line 130 will be above $V_{max}$, and the pulse generator will not be generating pulses.

In the preferred embodiment, the converter disable circuit, to prevent spurious shutdowns, automatically resets itself after ten seconds. It counts the number of such resets and, if after a number of resets, the fault still persists, the converter is locked out until it is reset manually. The operation of this circuit will be described in more detail in the description of FIG. 8.

The backfire protection circuit 166 can also be seen in FIG. 6. This circuit consists of four SR flip flops, 212 through 218; four AND gates, 220–226; four sensing circuits, 228 through 234; a four-input NOR gate 236; and the associated sensing lines.

During operation, the sensing circuit 228 monitors the voltage at the anode of diode 102. This circuit uses conventional techniques to provide a high output to AND gate 220 as long as current is flowing in the secondary winding of transformer 70. In the preferred embodiment, this circuit also provides voltage isolation between the logic circuitry and the converter circuitry by means of transformers or optoelectronic devices. The reset input of SR flip flop 212 is connected to sensing line 158 which monitors the pulse shaper controlling pulses to SCR 78. Therefore, as soon as SCR 78 is triggered, SR flip flop 212 will be reset, and its Q output will go low. The Q output of this flip flop is connected to one input of AND gate 220, and in the low state, this prevents AND gate 220 from passing the inhibit signal generated by the sensing circuit 228. The set input of flip flop 212 is connected to sensing line 164 which monitors pulses triggering SCR 84. In the interwoven firing order of this embodiment of the invention, SCR 84 is the SCR triggered immediately before SCR 78. Therefore, when SCR 84 is triggered, flip flop 212 changes state, its Q output goes high, and AND gate 220 is opened to permit an inhibit signal generated by sensing circuit 228 to pass to the input of NOR gate 236. Because AND gate 220 is not opened to pass the inhibit signal until just prior to the time when its associated SCR can be fired, the inhibit line 168 will not inhibit the formation of pulses in the pulse generator 128 due to current flowing in the secondary of transformer 70 unless SCR 78 is the next SCR to be fired.

Each of the three remaining flip flops has its set input connected to sense the triggering of the SCR which is fired in the interwoven order immediately before its associated SCR. At any given time, only one of the four flip flops will be in the set state, thereby allowing an inhibit signal to be passed to NOR gate 236, and that flip flop will be reset immediately after its associated SCR is triggered. Inhibit line 168 will inhibit the formation of pulses only when it is in the low state, which will occur when any one of the four inputs to NOR gate 236 is high. Because of the operation of the flip flops and the AND gates, only one output can be high at any time, and that will occur only when the sensing circuit for the next SCR to be triggered indicates that the secondary current is flowing.

With the inhibit line low, triggering of the next SCR in sequence will be delayed until such time as current ceases to flow in its secondary. As soon as the inhibit line returns to its high state, pulse generation will continue as usual.

This invention also incorporates a novel method for reducing objectionable noise during converter operation. During high power operation, five kilowatts for example, magneto-restrictive effects within the converter creates audible noise which can be ojectionable in the interior of an electric vehicle in which the converter is mounted. Previous designs have had to make the magnetic components massive or put them in sound muffling material to minimize this noise. The present invention, by operating at a higher frequency than previous designs, inherently produces a noise which is less objectionable. However, to reduce the objectionable qualities of the noise even further, the present invention modulates the frequency of the converter, even under constant load conditions, so as to spread the noise throughout the noise spectrum.

Previous designs operate at a constant frequency for a given load. This causes each noise pulse to reinforce the previous one producing a monotonic sound which pierces through the ambient noise.

Figure 7:
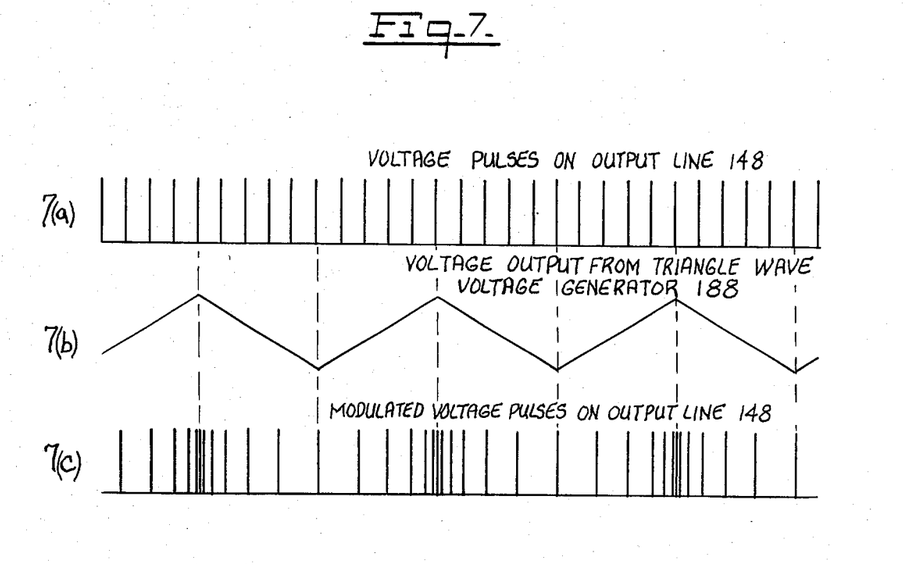
FIG. 7(a) is a graph which shows the voltage pulses at the output of the voltage controlled pulse generator 128 of FIG. 6 when the reference voltage at the non-inverting input of voltage comparator 180 is constant.
FIG. 7(b) is a graph which shows the output of the triangle wave generator 188 as a function of time.
FIG. 7(c) is a graph which shows the voltage pulses at the output of the voltage controlled pulse generator 128 when the output of the triangle wave generator 188 shown in FIG. 7(b) is applied to the non-inverting input of voltage comparator 180.

Referring now to FIG. 7(a), the trigger pulses on output line 148 can be seen which would be created under constant load with a constant lower reference voltage $V_1$ applied to the non-inverting input of comparator 180. FIG. 7(a) represents the same trigger pulses as can be seen in FIG. 4(j) but at a different time scale.

In the preferred embodiment, the lower reference voltage $V_1$ applied to comparator 180 is not constant but represents the output of triangle wave voltage generator 188, seen in FIG. 7(b). Thus, the lower voltage to which capacitor 174 is discharged is varied over time which varies the instantaneous operating frequency. FIG. 7(c) shows the voltage pulses on output line 148 which are actually generated under constant load conditions. Because the spacing between adjacent pulses is varied, the noise is spread throughout the sound spectrum and is easily lost in any practical background. This design is only possible because of the high basic operating pulse rate of the converter. The reason for this is that the frequency of the triangle wave voltage generator 188 must be high enough to be beyond the pass band of the voltage regulator in order that its own frequency components are not reflected in the output. On the other hand, it must be low enough such that its own period is more than five to six times the pulse period or it will not be effective in spreading the noise energy throughout the sound spectrum. Although the optimum frequency for the triangle wave generator will vary, in a converter operating at a maximum pulse frequency of 10 kHz, the optimum frequency for the triangle wave generator will usually lie between 100 Hz and 2 kHz.

Figure 8:
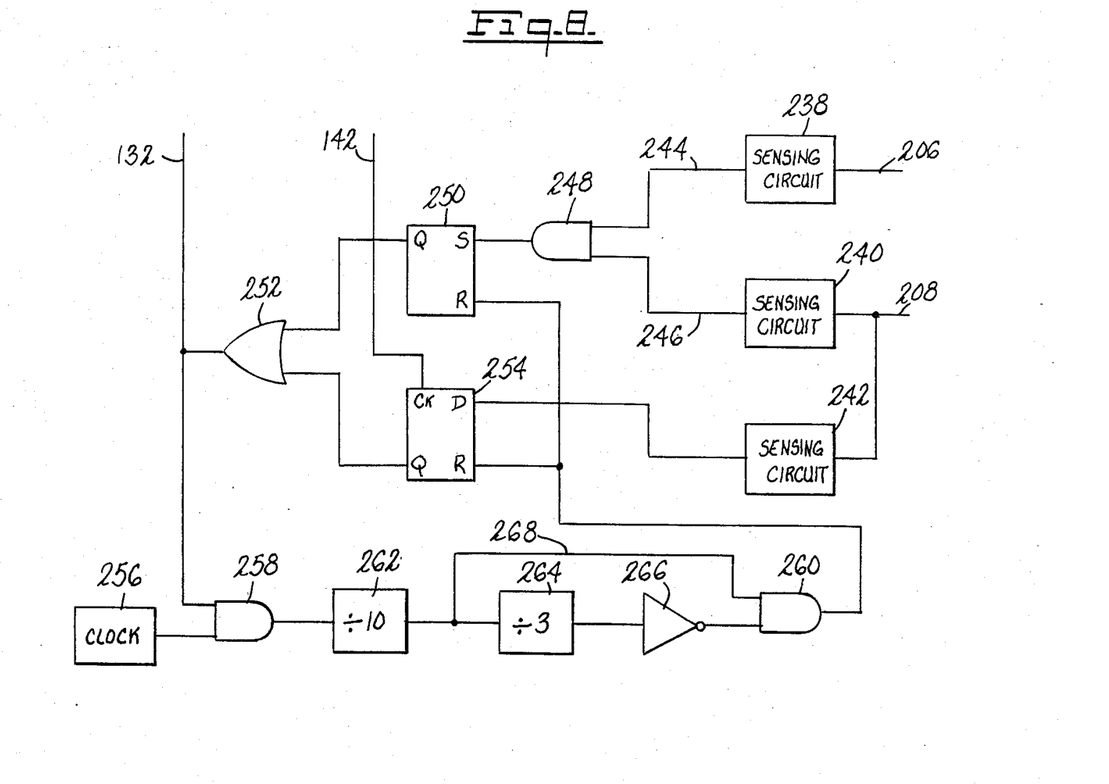
FIG. 8 is a partial circuit diagram showing the converter disable circuit 204 of FIG. 6.

FIG. 8 is a detailed circuit diagram showing the converter disable circuit 204 in greater detail. Sensing circuits 238, 240 and 242 are conventional and produce a logic high output whenever the voltage at their input is above or below a preset limit.

Logic line 244 will be high whenever the voltage on sensing line 206 indicates that the converter is being current limited. Logic line 246 will be high (in the preferred embodiment) whenever the voltage on sensing line 208 indicates that the converter output voltage has fallen below fifty percent (50%) of the desired output voltage. Only when these two conditions are satisfied will the output of AND gate 248 be high, which will drive the Q output of SR flip flop 250 high, and thereby disable line 132 high through OR gate 252.

The output of sensing circuit 242 will be high whenever the voltage on sensing line 208 indicates that the converter output voltage is substantially above the desired output voltage. In the preferred embodiment this limit is set at 1.2 times the desired output voltage.

The output of sensing circuit 242 is connected to the input of a D-type flip flop 254. As is well known, a high signal at the D input will not appear at the Q output until a clock pulse is applied to the clock (Ck) input of flip flop 254. Because the clock input of flip flop 254 is connected to the output of pulse generator 128 via sensing line 142, the Q output of flip flop 254 will not go high unless it simultaneously detects an overvoltage at the converter output, and the production of pulses by the pulse generator 128. As previously described, this condition can only occur during converter malfunctions.

To prevent spurious shutdowns, clock 256, AND gates 258 and 260, counters 2622 and 264, and converter 266 can reset the flip flops 250 and 254. In the preferred arrangement, clock 256 provides a clock pulse once per second. When the converter is disabled, disable line 132 is high, and the clock pulse will pass through AND gate 258 into counter 262 which will reset the flip flops after 10 clock pulses. The reset pulse from counter 262 is taken from its output over logic line 268 through AND gate 260 to the flip flop reset inputs which will drive the disable line 132 low and permit the converter the resume operation.

If the improper condition remains at the converter output, disable line 132 will again go high, disabling operation for another 10 seconds until AND gate 260 passes another reset pulse. After the third such reset, the output of counter 264 will go high, driving the output of inverter 266 low and thereby closing AND gate 260. Counter 264 will latch to prevent any further resets until it is manually reset.

Figure 9:
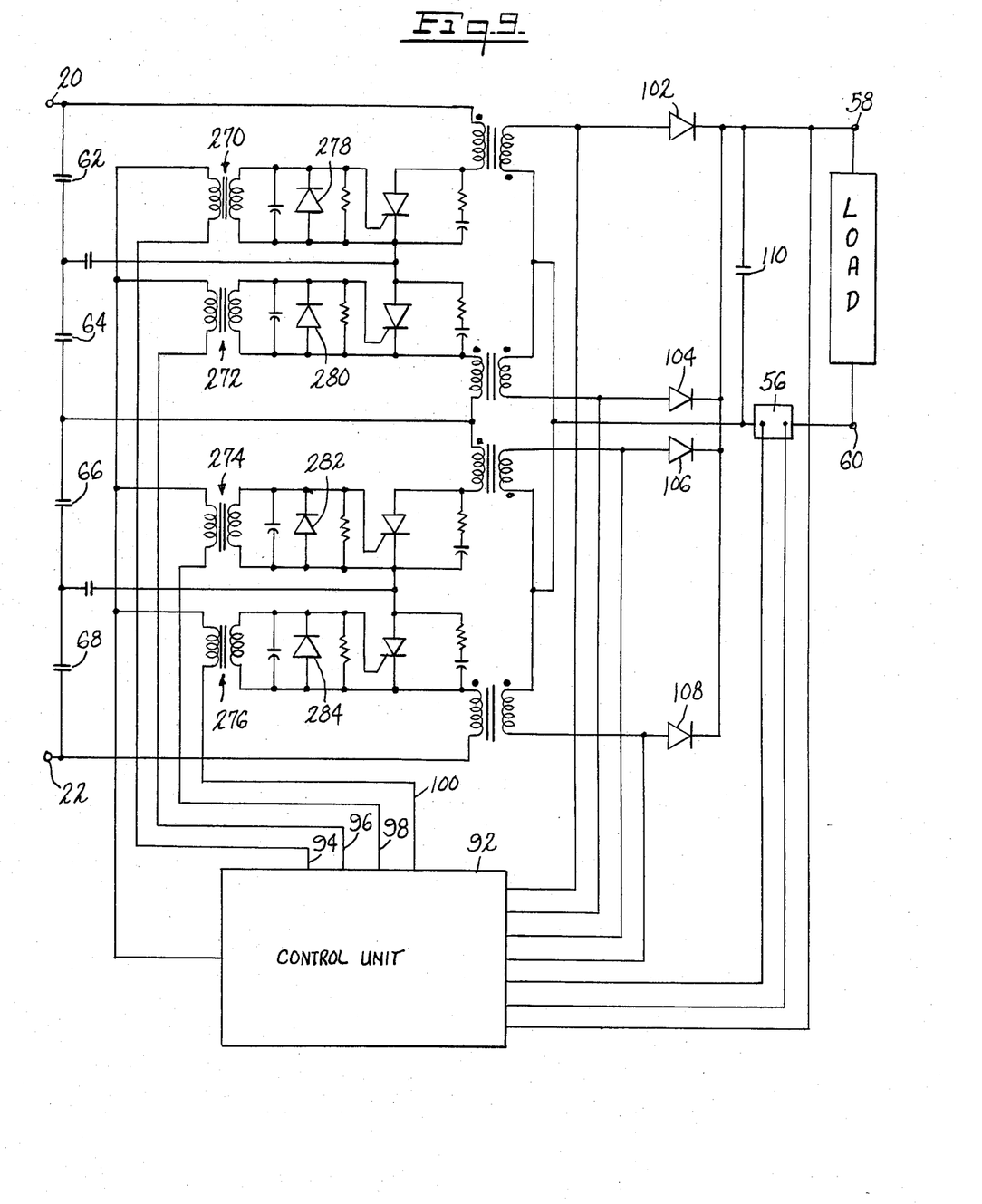

FIG. 9 shows a second embodiment of the invention in which pulse transformers 270, 272, 274 and 276 are used to isolate the logic circuitry inside control unit 92 from the high voltage in the converter primary circuit. The delay line 146 and AND gate 150, 152, 154 and 156 of FIG. 5 are used in this embodiment to insure that the trigger pulse width is sufficiently wide to turn on the SCR's under worst case conditions, and yet, sufficiently narrow to avoid problems with pulse transformer saturation due to excess volt-seconds.

Diodes 278, 280, 282 and 284 are used to protect the gate to cathode junction in the SCR's from reverse voltage spikes imposed by the pulse transformers. The remaining resistors and capacitors shown with each SCR serve to protect the SCR's in a conventional manner from various types of harmful voltage and current spikes.

The present invention has been described in a preferred embodiment for 600 V input operation wherein two SCR pairs are used, with the pairs being triggered in an interwoven firing order. One skilled in the art will note that multiple pairs of SCR's could be utilized for higher voltage operation, or conversely, will note the advantages to be obtained from the use of a control unit 92 to monitor secondary currents in the prior art circuit of FIG. 2 or other well-known designs for chopping type converters using controlled rectifiers and transformers. Such configurations as well as others which are apparent from this disclosure are within the spirit and scope of this invention.

What is claimed is:

1. A chopping type electrical converter wherein the chopping frequency is varied to control a DC output voltage, comprising:
   (a) a primary circuit for chopping an input voltage comprising:
      (i) at least one controlled rectifier, and
      (ii) at least one voltage transformer means associated with controlled rectifier and electrically connected thereto;
   (b) a secondary circuit comprising:
      (i) output terminals,
      (ii) rectifier means electrically connected to the voltage transforming means, and
      (iii) filtering means electrically connected to the output terminals and the rectifier means for providing the DC output voltage; and
   (c) a control unit comprising:
      (i) a pulse generator for generating trigger pulses at a variable frequency to trigger on the controlled rectifier and thereby chop the input voltage,
      (ii) a control circuit including means for sensing the output voltage, and means for controlling the frequency at which the pulse generator generates pulses, responsive to the sensed output voltage, to hold the output voltage at a desired output level over a range of output currents, and
      (iii) a backfire prevention circuit including means for sensing the presence of current flowing in the voltage transforming means associated with controlled rectifier, and including means for delaying trigger pulses to controlled rectifer until current has ceased to flow in its associated voltage transforming means.

2. An electrical converter as recited in claim 1 having at least two pairs of controlled rectifiers in the primary circuit, wherein the control unit triggers on the controlled rectifiers in an interwoven order by sequentially triggering a first controlled rectifier from the first pair, followed by a first controlled rectifier from the second pair, continuing in sequence until a controlled rectifier from each pair has been triggered whereupon the control unit then triggers on the second controlled rectifier from each pair in sequence until all the controlled rectifiers have been triggered.

3. An electrical converter as recited in claim 2 having exactly two pairs of silicon controlled rectifiers in the primary circuit.

4. An electrical converter as recited in claim 2 in which the voltage transforming means associated with each controlled rectifier comprises a transformer with a primary and a secondary winding.

5. An electrical converter as recited in claim 4 in which the filtering means in the secondary circuit includes a filter capacitor, and in which the length of time that current flows in the secondary winding of each transformer is longer than the length of time that current flows in the primary winding thereby simultaneously charging the filter capacitor from more than one source.

6. An electrical converter as recited in claim 4 in which the rectifier means in the secondary circuit comprises a diode connected in series with the secondary winding of the transformer associated with each controlled rectifier, and in which the backfire protection circuit in the control unit senses the voltage at the anode of each diode to detect the presence or absence of current flowing in the secondary winding of the transformer associated with each controlled rectifier.

7. An electrical converter as recited in claim 6 in which the backfire protection circuit comprises:
   (a) a sensing circuit for each controlled rectifier to sense when current is flowing in the secondary winding of its associated transformer and generate an output signal indicative thereof;
   (b) a gating means for passing the output signal from each sensing circuit prior to its associated controlled rectifier being triggered; and
   (c) means for producing an inhibit signal in response to the output signal passed from the gating means, the inhibit means being connected to the pulse generator to inhibit the generation of a trigger pulse to trigger the associated controlled rectifier.

8. An electrical converter as recited in claim 7 in which the sensing circuit includes a voltage isolating means for isolating the control unit from the secondary circuit; in which the gating means includes an AND gate and a bistable flip flop which changes state in response to sensed trigger pulses to open the AND gate and pass the output signal of the sensing circuit; and in which the means for producing an inhibit signal comprises a NOR gate.

9. An electrical converter as recited in claim 1 in which the control unit further comprises:
   (a) a pulse distributor for dividing and distributing the trigger pulses to the appropriate controlled rectifier;
   (b) a plurality of pulse shapers in electrical connection with the pulse distributors; and
   (c) a plurality of pulse amplifiers in electrical connection with the pulse shapers.

10. An electrical converter as recited in claim 9 in which the pulse shapers comprise a plurality of AND gates and a delay line connected to one input of each AND gate for adjusting the width of the trigger pulses.

11. An electrical converter as recited in claim 10 in which the primary circuit further comprises a pulse transformer connected to each controlled rectifier, and in which the pulse width from the pulse shaper is adjusted wide enough to trigger on the controlled rectifier under worst case conditions and narrow enough to avoid saturation of the pulse transformer.

12. An electrical converter as recited in claim 9 in which the pulse distributor comprises a serial-in, parallel-out shift register.

13. An electrical converter as recited in claim 1 in which the control circuit further includes a means for sensing the presence of pulses at the output of the pulse generator, and a disabling means responsive to the pulse sensing means and the output voltage sensing means which disables the triggering of the controlled rectifiers in response to the simultaneous presence of pulses at the output of the pulse generator and a voltage at the output terminals substantially in excess of the desired output level.

14. An electrical converter as recited in claim 13 in which the control circuit further includes a means for sensing the output current and in which the means for controlling the frequency of the pulse generator is responsive to the output current sensing means to limit the output current to a preset maximum.

15. An electrical converter as recited in claim 14 in which the disabling means is also responsive to the output current sensing means to disable the triggering of the controlled rectifiers in response to the simultaneous presence of output current equal to the preset maximum and output voltage substantially below the desired output level.

16. An electrical converter as recited in claim 15 in which the disabling means further includes:
    (a) a means for resetting the disabling means after a delay period;
    (b) a counter to count the number of resets; and
    (c) a latch responsive to the counted number of resets to latch the disabling means and prevent additional resets after the count has reached a given number.

17. An electrical converter as recited in claim 1 in which the pulse generator comprises:
    (a) a timing capacitor;
    (b) a current source for charging the timing capacitor;
    (c) a discharge means for discharging the timing capacitor;
    (d) a bistable flip flop to enable the discharge means in a first state and disable the discharge means in a second state;
    (e) voltage sensing means to trigger the flip flop into the discharge first state when the voltage on the timing capacitor reaches a high trigger level and to trigger the flip flop into the charging second state when the voltage reaches a low trigger level.
    (f) an inhibit control signal input to prevent the flip flop from leaving one state until the inhibit control signal is removed; and,
    (g) an output for providing pulses, the output being high when the flip flop is in one state, and low when the flip flop is in the other state.

18. An electrical converter as recited in claim 17 in which the high trigger level is set by the means for controlling the frequency of the pulse generator.

19. An electrical converter as recited in claim 18 further comprising a means for continuously varying the low trigger level thereby varying the frequency at which pulses are generated to disperse converter noise within the sound spectrum.

20. An electrical converter as recited in claim 19 in which the frequency at which the low trigger level is varied is between 100 Hz and 2 kHz.

21. A chopping type DC to DC converter comprising:
    (a) a primary circuit comprising:
        (i) at least two pairs of silicon controlled rectifiers (SCR's), each SCR having a control electrode and main electrodes.
        (ii) a step-down voltage transformer associated with each SCR having a primary and secondary winding, the primary winding of each transformer being serially connected with the main electrodes of its associated SCR, and
        (iii) input terminals, the primary transformer windings and main electrodes of the SCR's being serially connected between the input terminals;
    (b) a secondary circuit comprising:
        (i) output terminals
        (ii) a diode for each SCR, the diode being serially connected with the secondary winding of the transformer associated with its SCR, and
        (iii) output filtering means connected to the output terminals and the diodes for providing a filtered DC output voltage; and
    (c) a control unit comprising:
        (i) a pulse generator for generating trigger pulses at a variable frequency,
        (ii) a pulse distributor for distributing the trigger pulses to trigger the SCR's in an interwoven order by triggering sequentially a first member of each pair of SCR's followed by a second member of each pair of SCR's,
        (iii) a control circuit including means for sensing the output voltage, and means for controlling the frequency at which the pulse generator generates pulses, responsive to the sensed output voltage, to hold output voltages constant at a desired output level over a range of output currents, and
        (iv) a backfire and crossfire prevention circuit including means for sensing the presence of current flowing in the secondary winding of the transformer, means for sensing the triggering pulses to the SCR's and means for inhibiting the generation of trigger pulses by the pulse generator responsive to the current sensing means and the pulse sensing means to delay the triggering of the next SCR to be triggered in the interwoven sequence until after current has ceased to flow in the secondary winding of its associated transformer.

* * * * *

UNITED STATES PATENT AND TRADEMARK OFFICE
CERTIFICATE OF CORRECTION

PATENT NO. : 4,500,949

DATED : February 19, 1985

INVENTOR(S) : Ralph Prete

It is certified that error appears in the above-identified patent and that said Letters Patent are hereby corrected as shown below:

Column 5, line 25, delete "8" and substitute -- 9 --

Column 11, line 43, delete "134" and substitute --142 --

Signed and Sealed this

Twenty-sixth Day of November 1985

[SEAL]

Attest:

Attesting Officer

DONALD J. QUIGG

Commissioner of Patents and Trademarks